(12) United States Patent
Patrick

(10) Patent No.: US 11,825,866 B2
(45) Date of Patent: Nov. 28, 2023

(54) PROCESS FOR THE PREPARATION OF FOOD AND BEVERAGE PRODUCTS WITH REDUCED CARBON-14 CONTENT

(71) Applicant: Brett Patrick, Grants Pass, OR (US)

(72) Inventor: Brett Patrick, Grants Pass, OR (US)

( * ) Notice: Subject to any disclaimer, the term of this patent is extended or adjusted under 35 U.S.C. 154(b) by 430 days.

(21) Appl. No.: 16/813,580

(22) Filed: Mar. 9, 2020

(65) Prior Publication Data

US 2021/0274812 A1    Sep. 9, 2021

(51) Int. Cl.
| | | |
|---|---|---|
| *A23L 2/12* | (2006.01) | |
| *A23P 10/40* | (2016.01) | |
| *A23P 10/22* | (2016.01) | |
| *A23L 33/00* | (2016.01) | |

(52) U.S. Cl.
CPC ............... *A23L 2/12* (2013.01); *A23L 33/40* (2016.08); *A23P 10/22* (2016.08); *A23P 10/40* (2016.08)

(58) Field of Classification Search
CPC .. A23L 2/12; A23L 33/40; A23P 10/22; A23P 10/40
See application file for complete search history.

(56) References Cited

U.S. PATENT DOCUMENTS

| | | | |
|---|---|---|---|
| 5,471,785 A | 12/1995 | Matthews | |
| 5,956,896 A | 9/1999 | Miekka et al. | |
| 7,708,806 B2 | 5/2010 | Wright et al. | |
| 8,668,898 B1 | 3/2014 | Williams | |
| 8,782,948 B2 | 7/2014 | Harwood et al. | |
| 9,220,206 B2 | 12/2015 | Walliser | |
| 9,459,044 B1 | 10/2016 | Haddock et al. | |
| 9,491,915 B2 | 11/2016 | Storey | |
| 9,670,496 B2 | 6/2017 | D'Halluin et al. | |

FOREIGN PATENT DOCUMENTS

JP    4332273 B2 *   9/2009

OTHER PUBLICATIONS

Translation of JP-4332273-B2 (Year: 2009).*
Genome Reference Consortium (GRC) Human Genome Assembly build 38 (GRCh38), Dec. 24, 2013, 4 pages.
Lander, E. S. et al., "Initial sequencing and analysis of the human genome", Nature 409, Feb. 15, 2001, pp. 860-921.

(Continued)

*Primary Examiner* — Brent T O'Hern
(74) *Attorney, Agent, or Firm* — Chernoff, Vilhauer, McClung & Stenzel, LLP

(57) ABSTRACT

This invention provides a process to prepare consumable food and beverage products with reduced carbon-14 ($^{14}C$) content. Normal agricultural products capture carbon-dioxide ($CO_2$) with radioactive $^{14}C$ from atmospheric gases. Agricultural products grown in controlled environments such as a greenhouse with filtered atmospheric gases to remove $CO_2$ with $^{14}C$ can be harvested and processed into readily consumable products that omit the damage to human DNA that is unavoidable with our current food chain. This process provides food and beverage products with a lower than natural abundance of $^{14}C$ for consumption.

12 Claims, 1 Drawing Sheet

(56) References Cited

OTHER PUBLICATIONS

Patrick, A. D., & Patrick, B. E., "Carbon 14 decay as a source of somatic point mutations in genes correlated with cancer diagnoses", Stable Isotope Foundation, Grants Pass, Oregon, USA, 2017, 81 pages.
Purdom, C. E., "Biological hazards of carbon-14", New Sci. 298, Aug. 2, 1962, pp. 255-257.
Sassi, M., et al., "Carbon-14 decay as a source of non-canonical bases in DNA", Biochimica et Biophysica Acta 1840, 2014, pp. 526-534.
Sender, R., Fuchs, S., & Milo, R., "Revised estimates for the number of human and bacteria cells in the body", PLoS Biol 14(8): e1002533, Aug. 19, 2016, 14 pages.

* cited by examiner

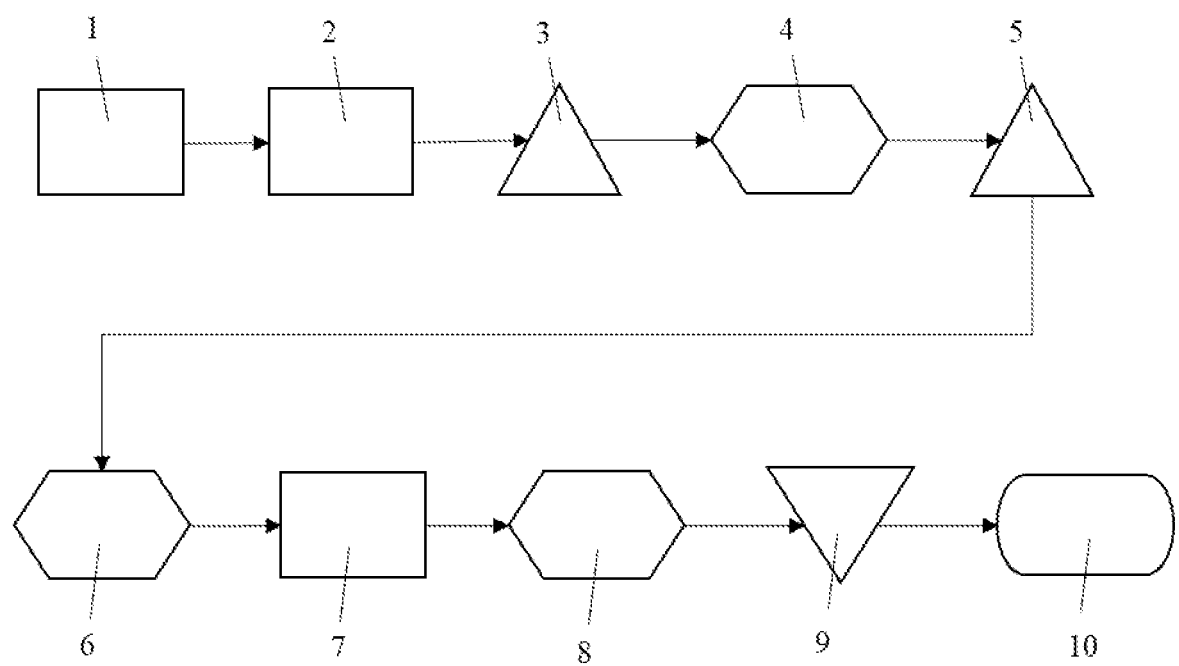

PROCESS FOR THE PREPARATION OF FOOD AND BEVERAGE PRODUCTS WITH REDUCED CARBON-14 CONTENT

BACKGROUND

This invention relates to a process to prepare dehydrated consumable food and beverage products with reduced carbon-14 (14C) content. Normal agricultural products capture carbon-dioxide (CO2) with 14C from atmospheric gases. Agricultural products with reduced radioactive 14C content can be grown in controlled environments such as a greenhouse for the benefit of reducing harmful damage to human DNA that is unavoidable with our current food chain, due to the natural abundance of 14C in atmospheric gases. Radioactive 14C decay to nitrogen-14 with the release of 156 KeV has long been known to have biological effects (Purdom, C. E.). Sequencing of the human genome has identified 6.1 billion base pairs in human DNA, with 119 billion carbon atoms in the DNA of each nucleated cell (Lander, E. S., and Genome Reference Consortium (GRC) Human Genome Assembly build 38 (GRCh38)). Recent quantitative analysis of human tissues has estimated 3 trillion nucleated cells in the human body (Sender, R., Fuchs, S., & Milo, R.). Given the natural abundance and half-life of $^{14}C$ and composition of our genome (i.e., a mean of roughly $6.0 \times 10^9$ base pairs with 19.5 carbon atoms each), in the average human this decay is occurring once per second in human DNA, resulting in potential bond ruptures, DNA strand breakage, and nitrogen substitution in canonical bases (Sassi, M., et. al.). This cumulative damage has been positively correlated to cancer diagnoses (Patrick, A. D., & Patrick, B. E.), and may have other yet-to-be-quantified effects on human tissues as we age. In fact, no mammal has yet lived without this cumulative damage, so the qualitative benefits of precluding this genetic alteration are yet-to-be-quantified. After agricultural products with reduced 14C have been grown, a means to process these into consumable products that can be rapidly distributed is needed. Dehydrated products with reduced 14C content are economical due to the omission of the cost of transporting water between the producer and consumer.

BACKGROUND—PRIOR ART

In commercial applications, no method or process has been formerly developed for transformation of agricultural products with a lower than natural abundance of $^{14}C$ to consumable products.

Patrick, B. E., in U.S. Pending patent Ser. No. 16/030,734 describes a process for the filtration of atmospheric gases which can be used with controlled environments for the growth of agricultural products with a lower than natural abundance of $^{14}C$. This does not describe any processing required for producing consumable food or beverage products.

D'Halluin, et. al, in U.S. Pat. No. 9,670,496, shows a method and means to modify a plant genome using an enzyme. While the genetic modification of plants can be useful for many applications and has been demonstrated in transgenic plant patents, no genetic modification of plants is required in our process, and no genetic modification would change the natural abundance of carbon isotopes, including 14C, within agricultural products.

Storey, Nathaniel R., in U.S. Pat. No. 9,491,915, shows a vertical hydroponic plant production apparatus utilized in a greenhouse for crop production. While this apparatus can be used in an environment with controlled atmospheric gases, similar to other unique systems and apparatus in other patents that may also be used within a greenhouse, this has no direct effect on the natural abundance of carbon isotopes in the agricultural products.

Haddock, et. al., in U.S. Pat. No. 9,459,044, shows methods for freeze drying products. This method or other similar methods could be used for dehydration method within the process for the preparation of food and beverage products with reduced $^{14}C$ content, but by itself does not describe a means of producing food or beverage products with reduced $^{14}C$ content.

Walliser, in U.S. Pat. No. 9,220,206, shows a hydroponic method and system that can regulate the nutrients and $CO_2$ in a greenhouse. While this is useful to improve agricultural product growth, quality, and yield, it has no effect on the natural abundance of carbon isotopes in the resulting agricultural products.

Williams, in U.S. Pat. No. 8,668,898, shows food and dietary supplements can be composed with a lower than natural abundance of 14C. While the composition of food and dietary supplements are detailed, the processes for converting agricultural products with a lower than natural abundance of $^{14}C$ to consumable products are not described or detailed.

Harwood, et. al, in U.S. Pat. No. 8,782,948, shows an aeroponic method of farming that includes the regulation of temperature, humidity, and $CO_2$ concentration within a controlled environment. While this is a useful technology for agricultural production, with advantages similar to hydroponics, it has no effect on the natural abundance of carbon isotopes in the resulting agricultural products.

Miekka, et. al., in U.S. Pat. No. 5,956,896, shows a method for growing plants in a controlled environment with a lower than natural abundance of $^{14}C$. While this identifies an essential method for the production of agricultural products with a lower than natural abundance of $^{14}C$, it does not include a process for transforming these plants into consumable products.

Matthews, in U.S. Pat. No. 5,471,785, shows a method for reducing 14C in living organisms by using fossil sources of carbon. While this is a useful method for the production of organisms to include agricultural products with a lower than natural abundance of $^{14}C$, it does not include a process for transforming these organisms into consumable products.

Wright, et. al., in U.S. Pat. No. 7,708,806, shows a method for extracting $CO_2$ from atmospheric gases which can be delivered into greenhouses or controlled environments to improve conditions for growth. While this is beneficial for agricultural production yields, the unselective use of $CO_2$ from atmospheric gases would have the effect of ensuring the natural abundance of $^{14}C$ in the agricultural products grown in the controlled environment, rather than lowering it. Like other methods that increase $CO_2$ content in growing environments using $CO_2$ from atmospheric gases, this is not applicable for the production of agricultural products with a lower than natural abundance of $^{14}C$, and it also does not include a process for transforming these plants into consumable products.

In conclusion, no method or process has been formerly developed for transformation of agricultural products with a lower than natural abundance of $^{14}C$ to consumable food or beverage products.

SUMMARY

Consumable food and beverage products with a reduced abundance of radioactive $^{14}C$ will have health benefits by reducing harmful damage to human DNA, which has been correlated to cancer. Other benefits of reduced cumulative genetic damage over long periods of time have yet to be quantified. To-date, there has been no process defined to package consumable food or beverage products with a reduced level of $^{14}C$ for consumers. Harvesting agricultural products grown in controlled environments with a lower than natural abundance of $CO_2$ with $^{14}C$, and processing these products into packaged hydrated or dehydrated meal replacement or beverage portions, constitutes a means for omitting harmful $^{14}C$ in consumers. This invention is also unlike typical food or beverage processing applications because the source of the agricultural products is very specific, to preclude natural $^{14}C$ contaminants that exist in our food chain. Removing hydration from meal replacement portions and beverages lowers the transportation cost of providing carbon-stable products and benefits to consumers. Furthermore, when freeze drying is utilized for dehydration as part of this food and beverage preparation process, a further benefit of extended shelf-life is provided to the consumer. This invention provides an efficient and economical process for agricultural products without harmful $^{14}C$ contamination to be provided to consumers.

DRAWINGS—FIGURES

FIG. 1 is a Process Diagram for Transforming Low $^{14}C$ Agricultural Products into Consumer Products.

DETAILED DESCRIPTION

FIG. 1. is a Process Diagram for Transforming Low $^{14}C$ Agricultural Products into Consumer Products. The process starts with agricultural products grown in a controlled environment with a lower than natural abundance of $CO_2$ with $^{14}C$ (1). Said products are harvested (2), and from the harvested products, consumable products are extracted (3). The consumable products are washed (4), and 4 may include multiple cycles to ensure the sanitation of products. From the washed products, edible components are extracted (5); Inedible components of the agricultural products may be discarded or used for other products. The products of 5 are subject to a pre-drying process (6); e.g., thick products may be sliced or diced. The products of (6) are then dehydrated (7). A post-drying process (8) may be applied; e.g., grinding of products into a powder. The products of 8 are then optionally merged with other products (9). The other products may be other products of 8, other natural organic products (e.g., spices), or non-organic compounds (e.g., salt). The products of 9 are then packaged (10) for distribution to consumers. Portion sizes for single serving meal replacements of food and beverages are typically between 8 and 16 ounces (or between 227 and 454 grams) with hydration.

For example, given that strawberries, raspberries, blackberries, and blueberries are each grown in a controlled environment with a lower than natural abundance of $CO^2$ with $_{14}C$, harvested, and processed separately through 6, dehydrated at step 7 with a freeze dryer, and ground into a powder at step 8. At step 9, these ingredients could then be merged into a product as follows: 7.5 g of strawberries, 7.5 g of raspberries, 11.25 g of blackberries, and 9 g of blueberries to produce a powdered berry beverage with 120 calories, 0 mg sodium, 27.8 g total carbohydrates, 10.5 g dietary fiber, 18.8 g total sugars, 3.0 g protein, 42.0 mg calcium, 1.5 mg iron, 324 mg potassium, and 121.5 mg vitamin C. The powdered fruit beverage mix could be combined with water at step 9 to produce a ready to consume beverage for packaging, or be packaged as a just-add-water powder at step 10.

As another example, given that strawberries, blueberries, raspberries, tomatoes, peas, and spinach are each grown in a controlled environment with a lower than natural abundance of $CO^2$ with $^{14}C$, harvested, and processed separately through 6, dehydrated at step 7 with a freeze dryer, and chopped into pieces at step 8. At step 9, these ingredients could then be merged into a product as follows: 8.1 g of strawberries, 10.5 g blueberries, 8.1 g of raspberries, 9.7 g tomatoes, 18.6 g peas, and 4.1 g spinach to produce a fruit and vegetable mix with 190 calories, 52.5 mg sodium, 37.2 g total carbohydrates, 12.9 g dietary fiber, 18.6 g total sugars, 10.5 g protein, 99.4 mg calcium, 4.0 mg iron, 727.8 mg potassium, and 196.3 mg vitamin C. The chopped fruit and vegetable mix could then be packaged as a just-add-water dehydrated meal at step 10, for which the consumer could prepare with a high-pressure steamer which would rehydrate the products. If the components were ground into a powder during post-dry processing at step 8, and mixed with the same ratios at step 9 above without rehydration, the powdered fruit and vegetable mix could be packaged as a just-add-water meal replacement beverage at step 10.

DRAWINGS—REFERENCE NUMERALS 1 agricultural growth in a controlled environment with reduced $^{14}C$ content
2 harvest of agricultural products
3 extraction of consumable products
4 washing of products
5 extraction of edible components
6 pre-dry processing
7 dehydration
8 post-dry processing
9 merging of ingredients
10 packaging Operation The operation for Transforming Low 14C Agricultural Products into Consumer Products.
1. Agricultural products are grown in a controlled environment with CO2 with a lower than natural abundance of 14C. This can be accomplished through the filtration of atmospheric gases (see U.S. Patent Pending application Ser. No. 16/030,734) and/or the supplementation of atmospheric gases in controlled environments with CO2 from sources that have lower than natural abundance of 14C (e.g., CO2 from fossil sources).
2. Agricultural products are harvested. This includes removing fruits and vegetables from the stems or branches of the plants they were grown on. The harvested products should be placed into air-tight containers at this stage and refrigerated until further processing resources are available.
3. The harvested agricultural products are each evaluated to determine if the product is consumable. Occasionally a product will be prematurely harvested, or be "too ripe" for consumption (i.e. harvested too late), or constitute an artifact from the agricultural production process that is not consumable (e.g., a stem or branch of a plant). Those products are removed from the product supply, resulting in the extraction of usable products.

4. The extracted usable products are washed with a water-based solution with multiple cycles in this step. Each cycle may have a different water-based solution. The solution may be filtered water to remove contaminants, may contain from one to a plurality of additives to regulate the pH (e.g, phosphoric acid), or may contain from one to a plurality of surfactants to aid with the removal of non-consumable compounds. The solution of the final cycle may simply be water with no additives to provide a rinse. Each or all of the cycles in this operation may be repeated as necessary to remove undesired or unconsumable compounds. This step of the operation constitutes a means of washing extracted consumable products, and washed consumable products are the output of this operation.
5. Edible components of the washed extracted usable products are further extracted in this step. Unusable products include leaves, stem remnants, or other organic artifacts attached to the harvested agricultural products that are not consumable (e.g., removal of the portion of a pea pod or tomato that is connected to a stem). The output of this step of the operation are edible extracted components and the remainder are discarded.
6. Any processing required for dehydration are applied to the extracted components in this step. For instance, freeze drying generally requires components to be no thicker than 0.75 inches, or near 1.9 cm, and this can be accomplished by passing the extracted components through a food processor that slices or dices components to these specified requirements. This pre-dry processing of extracted components may include slicing, dicing, chopping, or shredding at predetermined specified requirements for thickness. These specifications can be adjusted to smaller dimensions to expedite the dehydration process in the following step. This step of the operation constitutes a means of pre-dry processing of extracted edible components, and processed edible components are the output of this operation. These outputs then pass to the next step of the operation.
7. The remaining harvested components (or outputs of step 6) are then dehydrated. For instance, the process of freeze drying can be applied here. This step helps minimize the transportation costs of distributing the packaged consumable products of step 10 by reducing the mass of the products.
8. After dehydration, the products of step 7 are then subjected to a post-drying process 8. This step may include one or more cycles, each of which can include grinding, chopping, shredding, or pulverizing, with different predetermined specifications for output dimensions or characteristics. For agricultural products intended to be powdered, for instance, they can be ground, chopped with blades, or crushed into a fine powder, in one or several cycles of increasing fineness. This step constitutes a means of post-dry processing of dehydrated edible components, and the output of this step are post-processed dehydrated edible components.
9. After post-drying processing 8, the products may optionally be merged 9 with one or more products of 8 from other agricultural products (e.g., a product from a different genus or species), other non-agricultural products, compounds, or ingredients (e.g., sodium chloride), or other agricultural products, compounds, or ingredients produced from other sources, according to a pre-defined formula or recipe of proportions. This step constitutes a means of merging from one up to a plurality of other ingredients with post-processed dehydrated edible components, resulting in prepared products.
10. The products of 9 are then be packaged into containers, including bottles, cans, envelopes, or other containers intended for distribution to consumers. Packaged products are usually sealed and labeled prior to distribution to consumers with instructions for preparation or serving, to include rehydration if water is not one ingredient of 9.

I claim:

1. A method of preparing consumable food products with a lower than natural abundance of carbon-14 (14C) content comprising:
   a. growing agricultural items in a controlled environment that has a lower than natural abundance of 14C in carbon dioxide via filtration of atmospheric gases;
   b. harvesting agricultural products from said agricultural items resulting in harvested agricultural products, wherein the harvesting agricultural products includes placing said harvested agricultural products into air-tight containers and refrigerating said air-tight containers with said harvested agricultural products;
   c. extracting consumable products from said agricultural products resulting in extracted consumable products;
   d. washing said extracted consumable products resulting in washed consumable products;
   e. extracting edible components of said washed consumable products resulting in extracted edible components;
   f. pre-dry processing of said extracted edible components, resulting in processed edible components;
   g. dehydrating said processed edible components resulting in dehydrated edible components;
   h. post-dry processing of said dehydrated edible components resulting in post-dry processed dehydrated edible components; and
   i. merging from one or more ingredients with the post-dry processed dehydrated edible components resulting in prepared consumable food products.

2. The method according to claim 1, further comprising:
   a. powdering said post-processed dehydrated edible components to produce a beverage when mixed with water; and
   b. combining said powdered post-processed dehydrated edible components with water to produce the prepared consumable food products in a form of a beverage for distribution and consumption.

3. The method according to claim 2, wherein said water constitutes between 80% and 95% of mass of the beverage.

4. The method according to claim 1, further comprising powdering said post-processed dehydrated edible components to produce a beverage when mixed with water.

5. The method according to claim 1, further comprising portioning said post-processed dehydrated edible components to provide a meal replacement when rehydrated.

6. The method according to claim 1, further comprising:
   a. portioning said post-processed dehydrated edible components to provide a meal replacement when rehydrated; and
   b. combining said post-processed dehydrated edible components with water to produce the prepared consumable food products in form of a ready-to-eat meal replacement for distribution and consumption.

7. The method according to claim 6, wherein said water constitutes between 80% and 95% of mass of the meal replacement, and wherein packaging of said prepared consumable food products includes packaging said prepared consumable food products as a ready-to-eat meal replacement for distribution and consumption.

8. The method according to claim 1, further comprising:
a. portioning said post-processed dehydrated edible components to provide a meal replacement when rehydrated; and
b. powdering said post-processed dehydrated edible components to produce a beverage when mixed with water, wherein the packaging of said prepared consumable food products includes packaging said prepared consumable food products as a meal replacement beverage that is consumable with addition of water for distribution and consumption.

9. The method according to claim 1, further comprising:
a. portioning said post-processed dehydrated edible components to provide a meal replacement when rehydrated;
b. powdering said post-processed dehydrated edible components to produce a beverage when mixed with water; and
c. combining said post-processed dehydrated edible components with water, wherein the packaging of said prepared consumable food products include packaging said prepared consumable food products as a ready-to-drink meal replacement beverage for distribution and consumption.

10. The method according to claim 9, wherein said water constitutes between 80% and 95% of mass of the prepared consumable food products.

11. The method according to claim 1, wherein said packaging of said prepared consumable food products includes portioning said prepared consumable food products for a hydrated single serving size from 8 to 16 ounces.

12. The method according to claim 1, wherein the washing said extracted consumable products includes washing said extracted consumable products using one or more of filtered water, water with one or more additives to regulate pH, or water with one or more surfactants, to aid with removal of nonconsumable compounds.

* * * * *